United States Patent [19]

Jacobs et al.

[11] 3,793,042
[45] Feb. 19, 1974

[54] INSULATING MONOLITHIC REFRACTORY

[75] Inventors: Louis J. Jacobs, Chicago; Robert E. Fisher, Clarendon Hills; Frank T. Felice, Chicago, all of Ill.

[73] Assignee: Combustion Engineering, Inc., Windsor, Conn.

[22] Filed: Dec. 24, 1970

[21] Appl. No.: 101,261

[52] U.S. Cl. .................................. 106/68, 106/69
[51] Int. Cl. ............................................ C04b 35/14
[58] Field of Search ................... 106/68, 69, DIG. 2

[56] References Cited
UNITED STATES PATENTS

| | | | |
|---|---|---|---|
| 2,206,557 | 7/1940 | Bennett | 106/68 |
| 2,461,146 | 2/1949 | Cress | 106/68 |
| 2,586,814 | 2/1952 | Greenewald | 106/68 |
| 3,367,871 | 2/1968 | Mueller et al. | 106/68 |

*Primary Examiner*—James E. Poer
*Attorney, Agent, or Firm*—Stephen A. Schneeberger; Eldon H. Luther; Robert L. Olson

[57] ABSTRACT

An insulating, moldable monolithic refractory material for lining furnaces and the method of producing the same is disclosed. The material comprises diatomaceous earth which has been calcined for maximum volume stability, bentonite or other plastic clay materials and water. Also included may be expanded perlite for its insulating and strengthening characteristics and aluminum phosphate for its binding effect.

5 Claims, 1 Drawing Figure

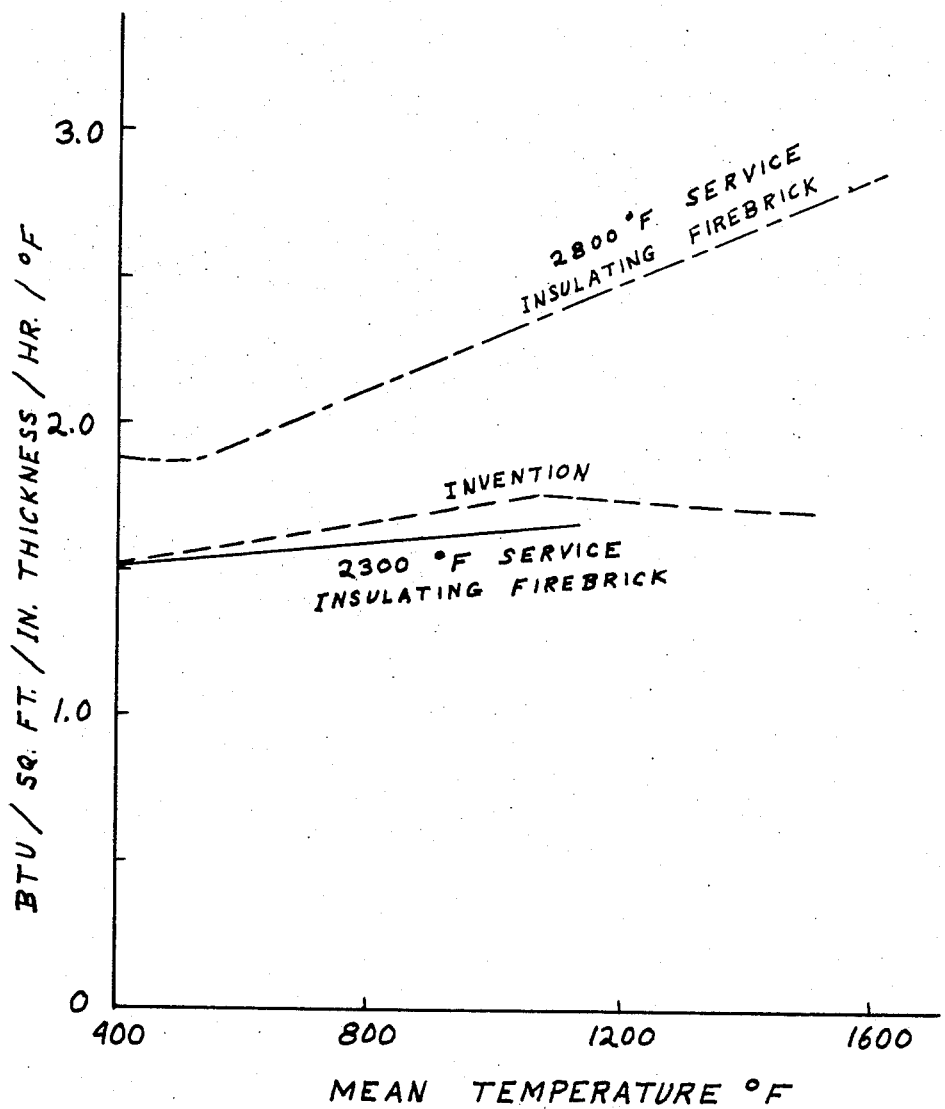

INSULATING MONOLITHIC REFRACTORY

BACKGROUND OF THE INVENTION

Conventional furnace linings are formed from insulating fire brick or from castable refractory materials. Installing fire brick linings often necessitates cutting special shapes and then mortaring the bricks into place. This requires considerable time and effort and the insulating characteristics are adversely effected by the mortar joints which have a higher conductivity value.

The installation of insulating castable refractories requires that forms be built into which the castable is poured. The castable must be carefully mixed with water and then transported to the form inside the furnace. The curing process takes anywhere from 24 to 48 hours after which the forms are taken off and removed from the furnace. At this point the drying operation may be started.

SUMMARY OF THE INVENTION

The present invention relates to moldable, monolithic refractory materials having high insulating values which can be readily and inexpensively installed as furnace linings. The material is basically composed of calcined diatomaceous earth, bentonite or other plastic clay materials and water. The insulating and strengthening characteristics may be improved by the inclusion of perlite, and aluminum phosphate may be included as a binder.

An object of the present invention is to provide a monolithic refractory material which is readily moldable and capable of being rammed into place, light weight, and which has high volume stability and insulating properties.

BRIEF DESCRIPTION OF THE DRAWING

The drawing is a graph indicating the relative insulating values of the refractory according to the present invention compared to conventional insulating fire brick.

DESCRIPTION OF THE PREFERRED EMBODIMENTS

The refractory material of the present invention comprises a base of calcined diatomaceous earth, bentonite or other plastic clay, expanded perlite, aluminum phosphate and water according to the following composition table which indicates the typical or preferred parts by weight as well as the permissible range:

|  | Typical Composition Parts By Weight | Range Parts By Weight |
|---|---|---|
| Calcined diatomaceous earth | 40.0 | 20–70 |
| Bentonite | 7.5 | 3–12 |
| Expanded perlite | 2.5 | 0–10 |
| Aluminum phosphate | 0.0 | 0–10 |
| Water | 50.0 | 20–70 |

The calcined diatomaceous earth is a coarse graded calcined diatomaceous silica aggregate that has been converted to the crystobalite form by calcining at not lower than 2,100°F. This calcining gives the diatomaceous earth maximum volume stability which prevents swelling during the heating cycles. A typical chemical analysis of the calcined diatomaceous earth is as follows:

|  | Percent |
|---|---|
| Silica ($SiO_2$) | 92.0 |
| Alumina $Al_2O_3$) | 5.0 |
| Ferric Oxide ($Fe_2O_3$) | 1.8 |
| Calcium Oxide (CaO) | 0.2 |
| Magnesium Oxide (MgO) | 0.3 |
| Loss on Ignition | 1.0 |

As indicated, the diatomaceous earth is coarse graded and has the following screen analysis range:

| Mesh | Percent Retained Minimum | Maximum |
|---|---|---|
| 3 | — | 2.0 |
| 4 | 3.0 | 7.0 |
| 6 | 9.0 | 14.0 |
| 8 | 12.0 | 17.0 |
| 10 | 50.0 | 10.0 |
| 20 | 35.0 | 40.0 |
| 30 | 7.0 | 12.0 |
| 50 | 3.0 | 11.0 |
| Through 50 | 15.0 | 25.2 |

The maximum bulk density of the calcined diatomaceous earth tapped in place is about 35 lb/ft³ and it will absorb 90–110 percent water by weight. The diatomaceous earth is a relatively low cost material and it contains micro size pores which are not readily crushed in the normal manufacturing operation and in the installation techniques used to install monolithic materials.

In the preferred embodiment of the invention, expanded perlite is included in the composition in order to increase the insulating qualities and to improve the strength characteristics. The perlite is extremely light weight and it begins to soften or melt between 1,500°F and 1,800°F. This softening or melting characteristic has been found to enhance the strength of the refractory in the temperature range above 1,500°F thus reducing the friability of the product. The expanded perlite is produced from raw perlite ore, which is a siliceous glass containing 2–5 percent combined water, by expanding in the temperature range of 1,600°F to 2,100°F. The range of chemical analysis of a typical expanded perlite is as follows:

|  | Percent by Weight Minimum | Maximum |
|---|---|---|
| Silica ($SiO_2$) | 73.0 | 75.0 |
| Alumina ($Al_2O_3$) | 13.0 | 14.0 |
| Ferric Oxide ($Fe_2O_3$) | 0.70 | 0.90 |
| Phosphorus Pentoxide | 0.00 | 0.05 |
| Titania | 0.10 | 0.15 |
| Calcium Oxide | 0.70 | 0.85 |
| Potassium Oxide | 4.50 | 5.00 |
| Sodium Oxide | 1.00 | 4.00 |

The preferred screen analysis of the expanded perlite is as follows:

| Mesh | Percent by Weight Minimum | Maximum |
|---|---|---|
| 20 | 35 | 40 |
| 30 | 23 | 27 |
| 50 | 18 | 22 |

-Continued

| Mesh | Percent by Weight Minimum | Maximum |
|---|---|---|
| 100 | 8 | 12 |
| Through 100 | 6 | 10 |

The refractory composition also includes a finely ground clay mineral which becomes plastic when mixed with water. This material is preferably bentonite, but other minerals may be used such as Kaolinite, halloysite, illite and attapulgite. Bentonite is a very finely ground air floated montomorillonite clay which becomes very sticky and plastic when mixed with water. The bentonite-water mixture swells considerably and has the ability to coat and bind the extremely large surface area of the calcined diatomaceous earth. A typical chemical analysis of bentonite is as follows:

| | Percent |
|---|---|
| Silica ($SiO_2$) | 64.0 |
| Alumina ($Al_2O_3$) | 21.0 |
| Ferric Oxide ($Fe_2O_3$) | 3.0 |
| Ferrous Oxide (FeO) | 0.46 |
| Magnesium Oxide (MgO) | 2.3 |
| Calcium Oxide (CaO) | 0.5 |
| Sodium Oxide ($Na_2O$) | 2.6 |
| Potassium Oxide ($K_2O$) | 0.4 |

Although the perlite and bentonite may provide sufficient bonding strength, aluminum ortho phosphate may be added to provide additional bonding strength in the quantities indicated hereinbefore.

The refractory material is manufactured by first charging the desired amounts of the calcined diatomaceous earth and water into a muller-type mixer. It is preferred that the muller clearance be on the order of 2 inches above the mixer floor in order to obtain the desired mixing effect and to avoid crushing the diatomaceous earth particles. After the water and diatomaceous earth have been mixed, the perlite is added to the muller type mixer and mixed after which the bentonite and aluminum phosphate are added. The material is then discharged from the mixer, formed into blocks, and packaged in watertight containers. At the job site the material is removed from the packages and rammed into place in the furnace structure. No mixing or forming is required other than the ramming operation.

The green properties of the refractory material as received at the job site are as follows:

| | |
|---|---|
| Moisture A.S.T.M. C-92 | 50% |
| Workability A.S.T.M. C-181 | 40% |
| Green Compression | 25 psi |
| Green Bulk Density | 80 lbs/ft³ |
| Dry Bulk Density | 42 lbs/ft³ |

After the material has been placed into the furnace and fired, the properties using standard refractory test procedures are as follows:

| Temperature °F. | Linear Change % | Modulus of Rupture (psi) | K Factor |
|---|---|---|---|
| 230 | — | 150 | — |
| 500 | 0.0 | 130 | 1.52 |
| 1000 | +0.1 | 100 | 1.71 |
| 1500 | +0.3 | 70 | 1.71 |
| 2000 | +0.5 | 50 | |
| 2300 | +0.2 | 50 | |

The chemical analysis of the fired refractory material is as follows:

| | Percent |
|---|---|
| Silica ($SiO_2$) | 85.44 |
| Alumina ($Al_2O_3$) | 7.82 |
| Ferric Oxide ($Fe_2O_3$) | 5.09 |
| Calcium Oxide (CaO) | 0.28 |
| Magnesium Oxide (MgO) | 0.59 |
| Alkalies | 0.66 |

One advantage of the refractory material of the present invention is that other monolithic refractory materials may be readily laminated thereto in order to provide different refractory materials in different portions of the furnace. For example, a monolithic refractory material which will withstand higher temperatures may be laminated over the refractory material of the present invention in selected furnace locations at which higher temperatures might occur. Also, other refractory materials which are resistant to slag attack may be laminated in locations where such attack is likely to take place.

As indicated, the monolithic refractory material of the present invention has relatively high insulating characteristics. The drawing illustrates the comparison between the conductivity of two types of insulating fire brick suitable for service to 2,300°F and 2,800°F and the monolithic refractory material of the present invention. Although the conductivity of the monolithic refractory lies between the values for the two types of fire brick, the total heat flow through the furnace wall may well be less when compared to the fire brick because of the absence of the brick joints which have a higher conductivity value.

While preferred embodiments of the invention have been described, it will be understood that these are merely illustrative and that changes may be made without departing from the spirit and scope of the invention as claimed.

We claim:

1. A plastic refractory composition suitable for ramming into place to form a monolithic refractory furnace lining consisting essentially of 20–70 parts by weight coarse graded calcined diatomaceous earth, said calcined diatomaceous earth being in the cristobalite form, 3–12 parts by weight finely ground plastic clay selected from the group consisting of bentonite, kaolinite, halloysite, illite and attapulgite, and 20–70 parts by weight water.

2. A refractory composition as recited in claim 1 wherein said calcined diatomaceous earth has a particle size screen analysis essentially as follows:

| Mesh | Percent Retained Minimum | Maximum |
|---|---|---|
| 3 | — | 2.0 |
| 4 | 3.0 | 7.0 |
| 6 | 9.0 | 14.0 |
| 8 | 12.0 | 17.0 |
| 10 | 5.0 | 10.0 |
| 20 | 35.0 | 40.0 |
| 30 | 7.0 | 12.0 |
| 50 | 3.0 | 11.0 |
| Through 50 | 15.0 | 25.0 |

3. A plastic refractory composition as recited in claim 1 and further including up to 10 parts by weight expanded perlite.

4. A plastic refractory composition as recited in claim 3 and further including up to 10 parts by weight aluminum phosphate.

5. A refractory composition as recited in claim 3 wherein said expanded perlite has been expanded in the temperature range of 1,600°F to 2,100°F and has a particle size screen analysis essentially as follows:

| Mesh | Percent by Weight | |
|---|---|---|
| | Minimum | Maximum |
| 20 | 35 | 40 |
| 30 | 23 | 27 |
| 50 | 18 | 22 |
| 100 | 8 | 12 |
| Through 100 | 6 | 10 |

* * * * *